(12) United States Patent
Lee et al.

(10) Patent No.: US 7,975,075 B2
(45) Date of Patent: Jul. 5, 2011

(54) DATA COMMUNICATION SYSTEM AND METHOD

(75) Inventors: Jong-tae Lee, Seongnam-si (KR); Jae-ho Han, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 324 days.

(21) Appl. No.: 12/074,805

(22) Filed: Mar. 6, 2008

(65) Prior Publication Data
US 2008/0320174 A1 Dec. 25, 2008

(30) Foreign Application Priority Data
Jun. 25, 2007 (KR) .................. 10-2007-0062486

(51) Int. Cl.
*G06F 3/00* (2006.01)
(52) U.S. Cl. ......... 710/10; 710/3; 710/5; 710/8; 710/18; 710/19; 710/20; 710/33; 710/62
(58) Field of Classification Search .................. 710/1, 3, 710/5, 8, 10, 18, 19, 20, 33, 62
See application file for complete search history.

(56) References Cited

U.S. PATENT DOCUMENTS

| | | | | |
|---|---|---|---|---|
| 5,351,041 A | * | 9/1994 | Ikata et al. | 340/825.24 |
| 5,884,102 A | * | 3/1999 | England et al. | 710/62 |
| 6,470,404 B1 | * | 10/2002 | Kim | 710/63 |
| 7,047,324 B2 | * | 5/2006 | Pang | 710/15 |
| 7,206,874 B2 | * | 4/2007 | Lee | 710/62 |
| 7,433,990 B2 | * | 10/2008 | Wurzburg et al. | 710/315 |
| 2004/0035930 A1 | * | 2/2004 | Arisawa et al. | 235/451 |
| 2004/0153809 A1 | * | 8/2004 | Goto | 714/36 |
| 2005/0055471 A1 | * | 3/2005 | Payne et al. | 710/5 |
| 2007/0255860 A1 | * | 11/2007 | Chen et al. | 710/8 |
| 2008/0263243 A1 | * | 10/2008 | Wright et al. | 710/63 |
| 2009/0024757 A1 | * | 1/2009 | Proctor | 709/232 |

FOREIGN PATENT DOCUMENTS

| | | |
|---|---|---|
| JP | 07-021101 A | 1/1995 |
| KR | 2000-0043472 A | 7/2000 |

* cited by examiner

*Primary Examiner* — Tariq Hafiz
*Assistant Examiner* — Jasjit S Vidwan
(74) *Attorney, Agent, or Firm* — Drinker Biddle & Reath LLP

(57) ABSTRACT

A method and system for performing serial data communication between a main device and an external module connected to the main device. The data communication system and method include a main device, and an external module connected to the main device and communicating data with the main device. The external module transmits its identification information to the main device before the external module and the main device communicate the data between each other, and the main device receives the identification information from the external module, confirms its connection to the external module, and transmits an identification information confirmation signal to the external module.

23 Claims, 4 Drawing Sheets

FIG. 3

(a) $\underbrace{\$}_{Rx}$ $\underbrace{01}_{serial}$ $\underbrace{01}_{version}$ $\underbrace{gps}_{category}$ (b) $\underbrace{\$}_{Rx}$ $\underbrace{07}_{serial}$ $\underbrace{03}_{version}$ $\underbrace{blu}_{category}$ (c) $\underbrace{\$}_{Rx}$ $\underbrace{05}_{serial}$ $\underbrace{02}_{version}$ $\underbrace{ird}_{category}$

FIG. 4

(a) $\underbrace{\%}_{Tx}$ $\underbrace{01}_{serial}$ $\underbrace{01}_{version}$ $\underbrace{gps}_{category}$ (b) $\underbrace{\%}_{Tx}$ $\underbrace{07}_{serial}$ $\underbrace{03}_{version}$ $\underbrace{blu}_{category}$ (c) $\underbrace{\%}_{Tx}$ $\underbrace{05}_{serial}$ $\underbrace{02}_{version}$ $\underbrace{ird}_{category}$

DATA COMMUNICATION SYSTEM AND METHOD

CROSS-REFERENCE TO RELATED PATENT APPLICATION

This application claims the benefit of Korean Patent Application No. 10-2007-0062486, filed on Jun. 25, 2007, in the Korean Intellectual Property Office, the disclosure of which is incorporated herein in its entirety by reference.

BACKGROUND OF THE INVENTION

1. Field of the Invention

The present invention relates to a method and system for performing serial data communication between a main device and an external module connected to the main device.

2. Description of the Related Art

FIG. 1 is a block diagram illustrating a conventional multiple serial communication apparatus disclosed in Korean Patent Application No. 1998-0059854. Referring to FIG. 1, the multiple serial communication apparatus changes the use of a universal asynchronous receiver/transmitter (UART) port 11 that performs RS232 communication according to the state of a port input/output (PIO) 12 in a communication control module 10. The multiple serial communication apparatus employed in a control board of a mobile communication system recognizes the RS232 communication according to the connection state of a cable, outputs a logical LOW state of the PIO 12 of the communication control module 10, and uses the UART port 11 for RS232 communication under the control of a selector 80. However, when the multiple serial communication apparatus fails to recognize the RS232 communication according to the connection state of the cable, the apparatus may output a logical HIGH state of the PIO 12 of the communication control module 10, and use the UART port 11 for infrared communication under the control of the selector 80.

Two UART serial communication pins Rx and Tx (the UART port 11) are conventionally used to perform standardized serial communication. For example, if it is possible to connect a device A to modules B and C via RS232 communication, the modules B and C that are connected to the device A perform communication, whereas the device A merely receives data but does not determine whether the module B or C is actually connected to device A. Thus, another detection pin is needed to recognize such a connection.

SUMMARY OF THE INVENTION

The present invention provides a method and system for communicating data that is capable of recognizing the type of external module connected to a main device by using two universal asynchronous receiver/transmitter (UART) serial communication pins Rx and Tx only, without the need for another detection pin.

Accordingly, an embodiment of the present invention provides a data communication method comprising a main device and an external module connected to the main device and communicating data with the main device, such that the external module transmits its identification information to the main device before the external module and the main device communicate the data therebetween, and the main device receives the identification information from the external module, confirms its connection to the external module, and transmits an identification information confirmation signal to the external module. The external module may communicate the data with the main device after receiving the identification information confirmation signal, and may periodically transmit its identification information to the main device.

The main device may determine a type of the external module from the identification information and converts its mode to a communication mode of the external module. The identification information received by the main device may comprise at least a type of the external module. The identification information confirmation signal transmitted by the main device may comprise at least a signal indicating that the main device is successfully connected to the external module.

Another embodiment of the present invention provides a data communication system comprising a main device including receiver/transmitter ports used to perform serial data communication with an external module, and an external module including receiver/transmitter ports used to perform serial data communication with the main device. The transmitter port of the external module transmits its identification information to the receiver port of the main device before the serial data communication is performed, such that the transmitter port of the main device transmits a signal, indicating that the main device is connected to the external module, to the receiver port of the external module.

The receiver/transmitter ports of the main device and the receiver/transmitter ports of the external module may perform serial data communication therebetween after receiving/transmitting the identification information and the signal indicating that the main device has been connected to the external module. The transmitter port of the external module may periodically transmit its identification information to the receiver port of the main device.

The identification information received by the receiver port of the main device may comprise information on a receiver, a serial number, version information, and category of the external module. The signal indicating that the main device is connected to the external module and transmitted by the transmitter port of the main device may comprise information on a transmitter, the serial number, the version information, and the category of the external module.

Another embodiment of the present invention provides a method of communicating data between a main device and an external module connected to the main device. The method comprises operating the external module to transmit its identification information to the main device, and operating the main device to receive the identification information from the external module confirming its connection to the external module, and transmit an identification information confirmation signal to the external module. If the external module receives the identification information confirmation signal, data is communicated between the external module and the main device.

The identification information may be periodically transmitted to the main device. The identification information may comprise at least a type of the external module. The identification information confirmation signal may comprise at least a signal indicating that the main device has been successfully connected to the external module.

BRIEF DESCRIPTION OF THE DRAWINGS

The above and other features and advantages of the present invention will become more apparent by describing in detail exemplary embodiments thereof with reference to the attached drawings in which:

FIGS. 3A through 3C illustrate examples of a format of identification information received by a main device from an external module in FIG. 2 according to an embodiment of the present invention;

FIGS. 4A through 4C illustrate examples of a format of an identification information confirmation signal transmitted by the main device to the external module in FIG. 2 according to an embodiment of the present invention.

DETAILED DESCRIPTION OF THE EMBODIMENTS

Embodiments of the present invention will now be described more fully with reference to the accompanying drawings.

Figure 1:
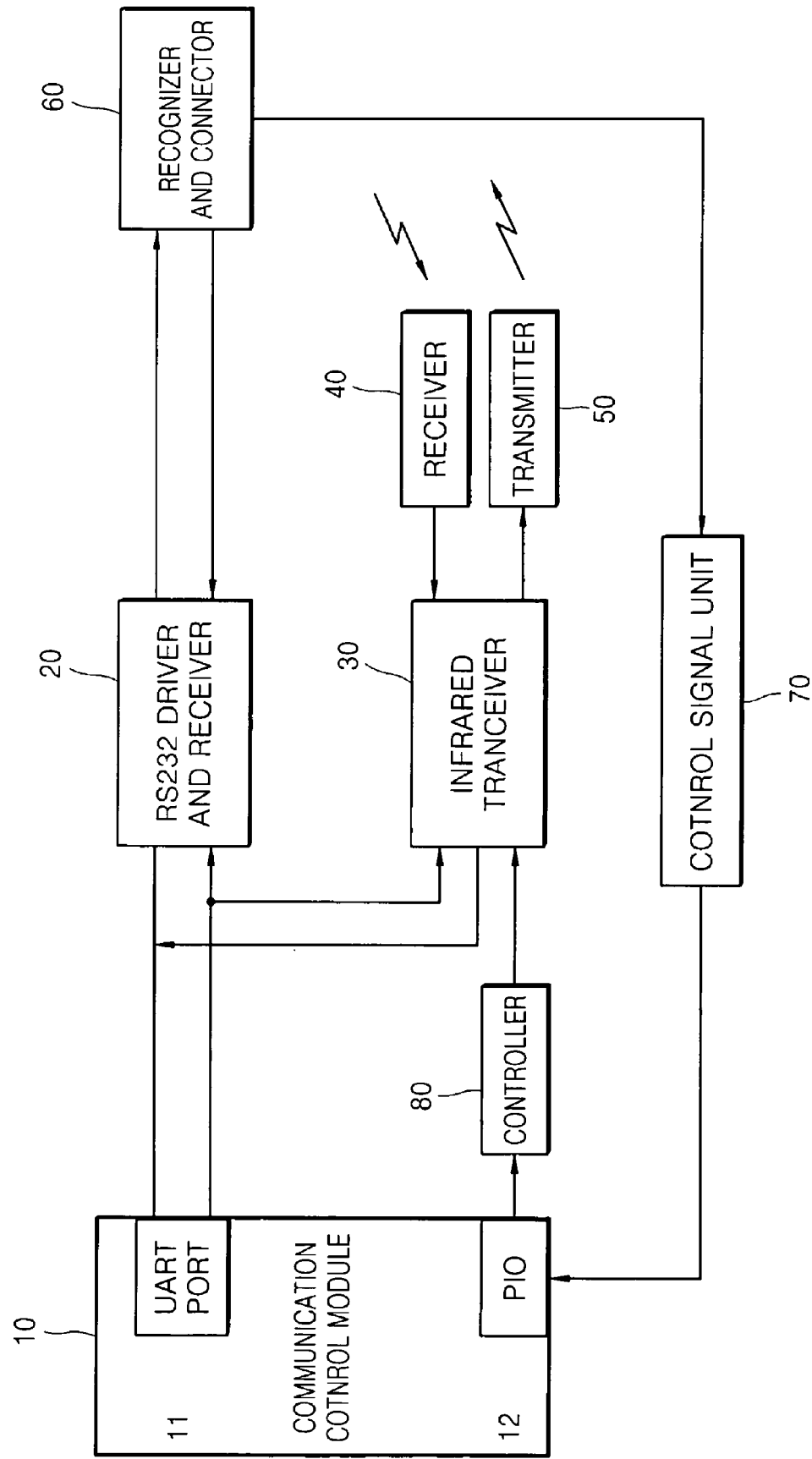
FIG. 1 is a block diagram illustrating a conventional multiple serial communication apparatus as disclosed in Korean Patent Application No. 1998-0059854.
Figure 2:
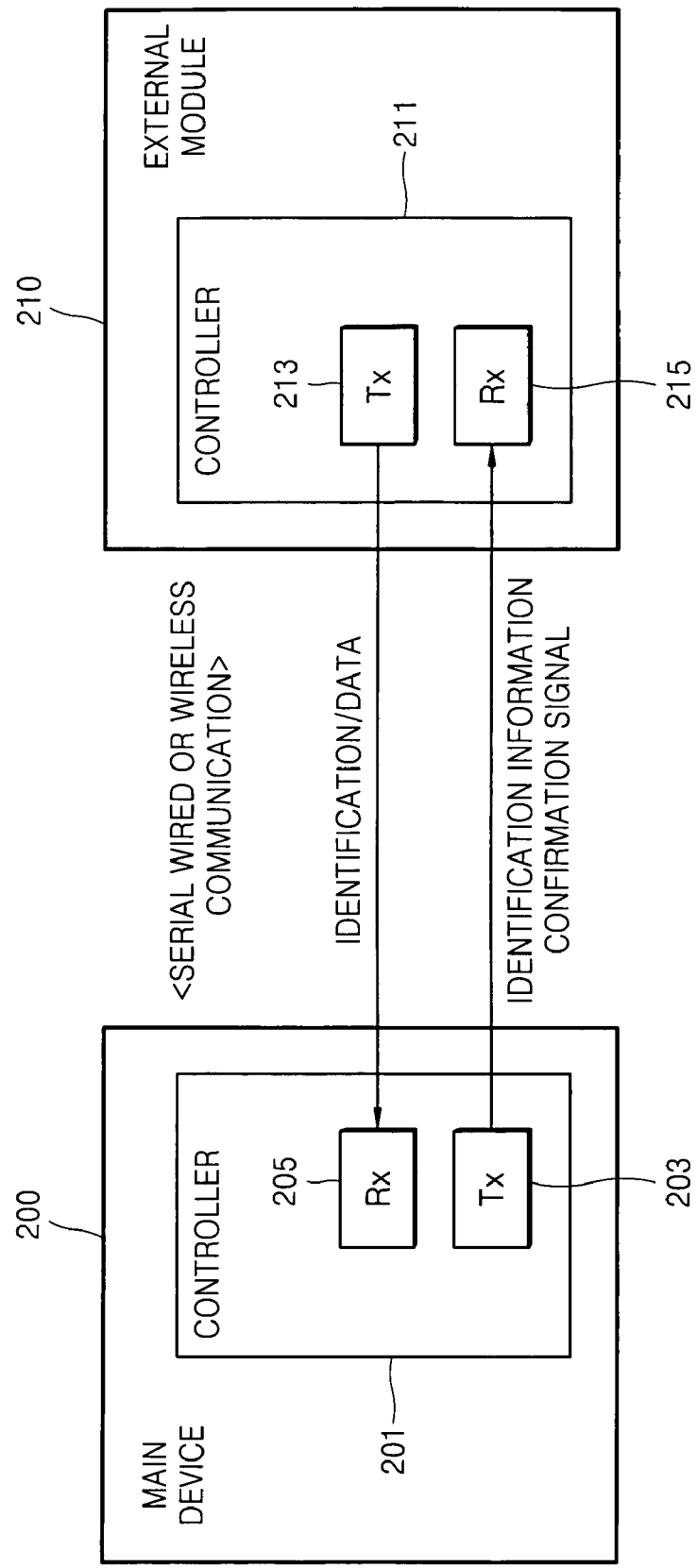
FIG. 2 is a block diagram of an example of a data communication system according to an embodiment of the present invention.

FIG. 2 is a block diagram of a data communication system according to an embodiment of the present invention. Referring to FIG. 2, the data communication system comprises a main device 200 and an external module 210. The main device 200 may be a digital camera, a terminal, a portable terminal, or the like that employs a 24-pin connector following 24 pin standards defined by the telecommunication technology association (TTA), during universal asynchronous receiver/transmitter (UART) serial communication.

The external module 210 that is connected to the main device 200 and performs serial data communication with the main device 200 may be a global positioning system (GPS) module, a Bluetooth module, or an infrared data association (IrDA) module. The main device 200 and the external module 210 can be connected via a wired cable (not shown) or wirelessly to perform serial data communication.

For example, if the main device 200 is the digital camera, and the external module 210 is the GPS module, the digital camera and the GPS module are wired or wirelessly connected so that the digital camera receives location information stored in the GPS module and stores location information received when an image file taken by the digital camera is stored. If the main device 200 is the portable terminal, and the external module 210 is the Bluetooth module, the portable terminal receives and stores a predetermined image signal from the Bluetooth module.

The main device 200 in this example includes a controller 201, which controls the main device 200 and comprises a transmitter port (hereinafter referred to as a Tx port) 203 and a receiver port (hereinafter referred to as an Rx port) 205 for performing the serial data communication. The external module 210 in this example includes a controller 211, which controls the external module 210 and comprises a Tx port 213 and an Rx port 201 for performing the serial data communication.

The Rx port 205 of the main device 200 merely receives data from the external module, but need not be informed of what type of the external module 210 is connected to the main device 200. Therefore, according to an embodiment of the present embodiment of the present invention, the main device 200 recognizes the type of the external module 210 so as to display a current data communication state as an on screen display (OSD), or control the state of the main device 200 in conformity with the external module 210. Hence, the Rx port 205 of the main device 200 periodically receives identification information of the external module 210 from the Tx port 123 of the external module 210 before serial data communication is performed.

FIGS. 3A through 3C illustrate an example of a format of identification information received by the main device 200 from the external module 210 according to an embodiment of the present invention. Referring to FIGS. 3A through 3C, the format of the identification information includes at least a category of the external module 210, that is, the type of the external module 210 connected to the main device 200. The type of the external module 210 may be the GPS module, Bluetooth module, or a IrDA module as shown in FIGS. 3A through 3C, or any other suitable type of module.

In more detail, the format of the identification information comprises an identifier indicating that the main device 200 receives the identification information, a serial number, version information, and category of the external module 210. Referring to FIG. 3A, in the identification information "$0101gps", "$" indicates the identifier indicating that the main device 200 receives the identification information, the first "01" indicates the serial number of the external module 210, the second "01" indicates the version information of the external module 210, and "gps" indicates that the category of the external module 210 is the GPS module. Referring to FIG. 3B, in the identification information "$0703blu", "$" indicates the identifier indicating that the main device 200 receives the identification information, "07" indicates the serial number of the external module 210, "03" indicates the version information of the external module 210, and "blu" indicates that the category of the external module 210 is the Bluetooth module. Referring to FIG. 3C, in the identification information "$0502ird", "$" indicates the identifier indicating that the main device 200 receives the identification information, "05" indicates the serial number of the external module 210, "02" indicates the version information of the external module 210, and "ird" indicates that the category of the external module 210 is the IrDA module.

The Rx port 205 of the main device 200 receives the identification information shown in FIGS. 3A through 3C from the Tx port 213 of the external module 210, performs signal processing to output a current communication state as an OSD, and converts the main device 200 into a communication mode of the external module 210 to perform serial data communication. Thereafter, the Tx port 203 of the main device 200 transmits an identification information confirmation signal to the Rx port 215 of the external module 210. The identification information confirmation signal is a signal indicating that the main device 200 is successfully connected to the external module 210, so that the main device 200 and the external module 210 can perform serial data communication therebetween.

FIGS. 4A through 4C illustrate an example of a format of the identification information confirmation signal transmitted by the main device 200 to the external module 210 according to an embodiment of the present invention. Referring to FIGS. 4A through 4C, the identification information confirmation signal includes at least an identifier indicating that the external module 210 has been successfully connected to the main device 200. In this example, the format of the identification information confirmation signal comprises the identifier indicating that the main device 200 transmits the identification information confirmation signal to the external module 210 that has been successfully connected to the main device 200, a serial number, version information, and category of the external module 210.

Referring to FIG. 4A, in an identification information confirmation signal "% 0101gps", "%" indicates the identifier indicating that the main device 200 transmits the identification information confirmation signal to the external module 210 that is a GPS module and has been successfully connected to the main device 200, the first "01" indicates the serial number of the external module 210, the second "01" indicates the version information of the external module 210, and "gps" indicates that the category of the external module 210 is the GPS module. Referring to FIG. 4B, in an identification information confirmation signal "% 0703blu", "%" indicates the identifier indicating that the main device 200 transmits the identification information confirmation signal to the external module 210 that is a Bluetooth module and has been successfully connected to the main device 200, "07" indicates the serial number of the external module 210, "03" indicates the version information of the external module 210, and "blu" indicates that the category of the external module 210 is the Bluetooth module. Referring to FIG. 4C, in an identification information confirmation signal "% 0502ird", "%" indicates the identifier indicating that the main device 200 transmits the identification information confirmation signal to the external module 210 that is an IrDA module and has been successfully connected to the main device 200, "05" indicates the serial number of the external module 210, "02" indicates the version information of the external module 210, and "ird" indicates that the category of the external module 210 is the IrDA module.

If the Rx port 215 of the external module 210 receives the identification information confirmation signal shown in FIGS. 4A through 4C from the Tx port 203 of the main device 200, the main device 200 and the external module 210 perform serial data communication therebetween. However, if the Rx port 215 of the external module 210 fails to receive the identification information confirmation signal from the Tx port 203 of the main device 200, the external module 210 periodically requests the main device 200 to transmit the identification information confirmation signal. Even after a predetermined period of time elapses, if the Rx port 215 of the external module 210 does not receive the identification information confirmation signal from the Tx port 203 of the main device 200, the main device 200 fails to recognize the external module 210. Thus, the main device 200 and the external module 210 cannot perform serial data communication therebetween.

Figure 5:
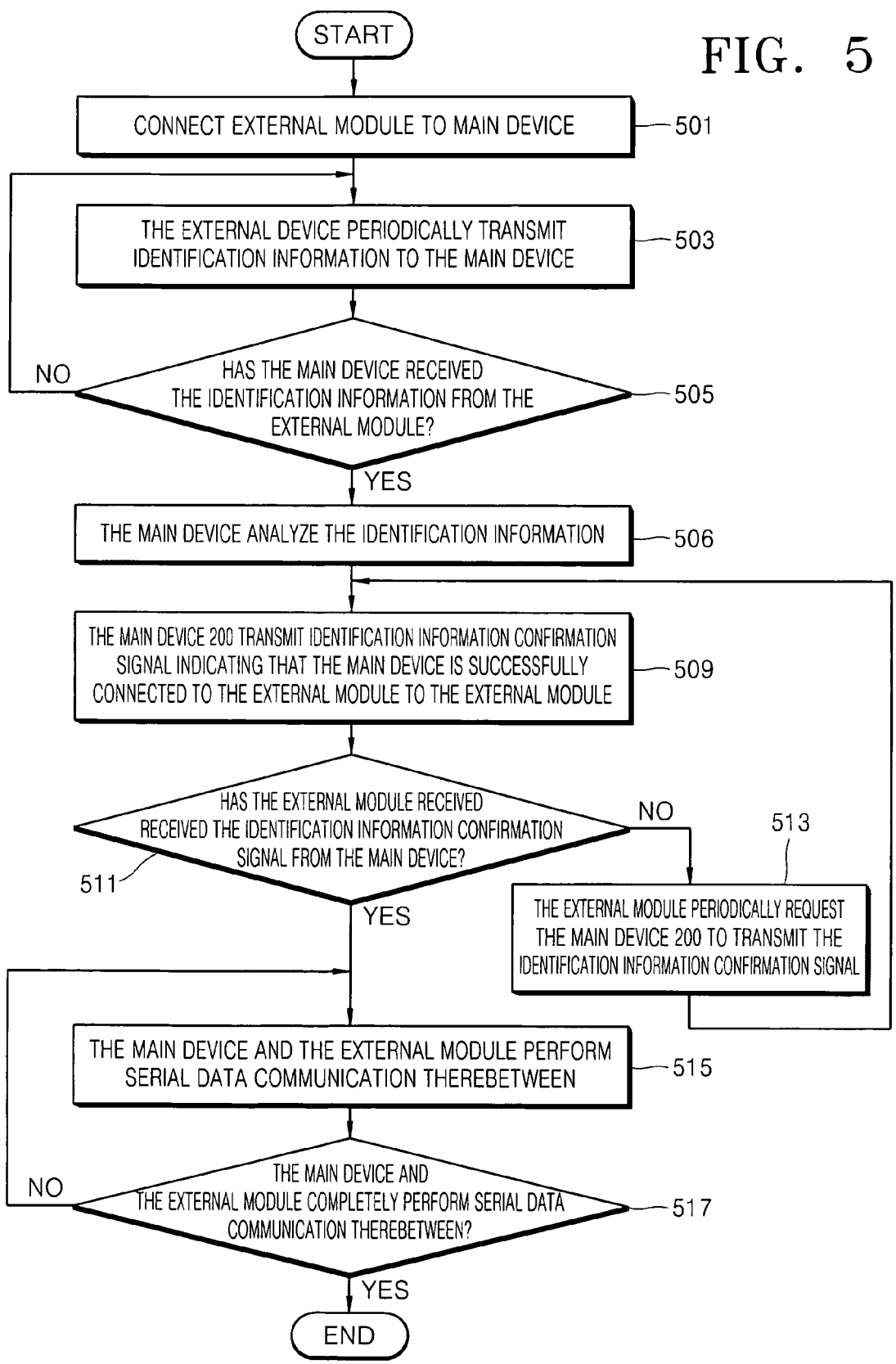
FIG. 5 is a flowchart of an example of a data communication method according to an embodiment of the present invention.

FIG. 5 is a flowchart of an example of a method of communicating data between the main device 200 and the external module 210 according to an embodiment of the present invention. Referring to FIG. 5, the external module 210 is connected to the main device 200 in operation 501. The external module 210 can be connected to the main device 200 via a wired cable or wirelessly.

Thereafter, the external device 210 periodically transmits its identification information to the main device 200 in operation 503. In this example, the Rx port 205 of the main device 200 periodically receives the identification information from the Tx port 123 of the external module 210. The format of the identification information of the external module 210 that the main device 200 receives includes at least a category of the external module 210, that is, the type of the external module 210 connected to the main device 200. In this example, the format of the identification information comprises an identifier indicating that the main device 200 receives the identification information, a serial number, version information, and category of the external module 210.

If it is determined in operation 505 that the main device 200 completely receives the identification information of the external module 210, the main device 200 analyzes the identification information of the external module 210 in operation 507. The main device 200 confirms the serial number, version information, and category of the external module 210 from the identification information. The main device 200 performs signal processing to output a current communication state as an OSD, and converts the main device 200 into a communication mode of the external module 210 to perform serial data communication.

Then, the main device 200 transmits an identification information confirmation signal indicating that the main device 200 is successfully connected to the external module 210 to the external module 210 in operation 509. In this example, the Tx port 203 of the main device 200 transmits the identification information confirmation signal to the Rx port 215 of the external module 210. The identification information confirmation signal is a signal indicating that the main device 200 has been successfully connected to the external module 210, so that the main device 200 and the external module 210 can perform serial data communication therebetween. The identification information confirmation signal includes at least an identifier indicating that the external module 210 is successfully connected to the main device 200. In this example, the format of the identification information confirmation signal comprises the identifier indicating that the main device 200 transmits the identification information confirmation signal to the external module 210 that has been successfully connected to the main device 200, a serial number, version information; and category of the external module 210.

It is determined in operation 511 if the external module 210 receives the identification information confirmation signal from the main device 200. If the external module 210 does not receive the identification information confirmation signal from the main device 200, the external module 210 periodically requests the main device 200 to transmit the identification information confirmation signal in operation 513). After a predetermined period of time elapses, if the Rx port 215 of the external module 210 does not receive the identification information confirmation signal from the Tx port 203 of the main device 200, it is determined that the main device 200 has failed to recognize the external module 210. Thus, the main device 200 and the external module 210 cannot perform serial data communication therebetween.

If the external module 210 receives the identification information confirmation signal from the main device 200, the main device 200 and the external module 210 perform serial data communication therebetween in operation 515. For example, if the main device 200 is a digital camera, and the external module 210 is a GPS module, the digital camera and the GPS module are wired or wirelessly connected so that the digital camera receives location information stored in the GPS module and stores location information received when an image file taken by the digital camera is stored. For example, if the main device 200 is the portable terminal, and the external module 210 is the Bluetooth module, the portable terminal receives and stores a predetermined image signal from the Bluetooth module. Thereafter, the main device 200 and the external module 210 completely perform serial data communication therebetween in operation 517o.

Hence, as can be appreciated from the above, the embodiments of the present invention can recognize the type of an external module connected to a main device using two universal asynchronous receiver/transmitter (UART) serial communication pins Rx and Tx only, without the allocation of a detection pin.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A data communication system comprising:
   a main device; and
   an external module connected to the main device and communicating data with the main device,
   wherein the external module transmits its identification information to the main device before the external module and the main device communicate the data therebetween, and the main device receives the identification information from the external module, confirms its connection to the external module, and transmits an identification information confirmation signal to the external module,
   wherein if the external module fails to receive the identification information confirmation signal from the main device, the external module periodically requests the main device to transmit the identification information confirmation signal for a predetermined period of time,
   wherein the identification information comprises a type of the external module, and the state of the main device is controlled in conformity with the type of the external module based on the identification information,
   wherein the main device comprises a universal asynchronous receiver/transmitter (UART) port, the external module comprises a UART port, and the main device and the external module communicate data using UART serial communication, and
   wherein the main device recognizes the type of the external module using only transmit (Tx) and receive (Rx) pins of the UART port without using a separate detection pin of the UART port.

2. The data communication system of claim 1, wherein the external module communicates the data with the main device after receiving the identification information confirmation signal.

3. The data communication system of claim 1, wherein the external module periodically transmits its identification information to the main device.

4. The data communication system of claim 3, wherein the external module remains communicatively connected to the main device while periodically transmitting the identification information to the main device.

5. The data communication system of claim 1, wherein the main device determines a type of the external module from the identification information and converts its mode to a communication mode of the external module.

6. The data communication system of claim 1, wherein the identification information confirmation signal transmitted by the main device comprises at least a signal indicating that the main device is successfully connected to the external module.

7. The data communication system of claim 6, wherein the signal indicating that the main device is successfully connected to the external module comprises information pertaining to a transmitter, the serial number, the version information, and the category of the external module.

8. The data communication system of claim 1, wherein the identification information received by the main device comprises information pertaining to a receiver, a serial number, version information, and category of the external module.

9. The data communication system of claim 1, wherein the main device recognizes the type of the external module based on the identification information, and displays a current data communication state according to the type of the external module.

10. The data communication system of claim 1, wherein the controlling of the state of the main device comprises at least one of displaying the state of communication between the main device and the external module, and controlling a communication operation and a digital signal processing operation according to the type of the external module.

11. A data communication system comprising:
    a main device including receiver/transmitter ports used to perform serial data communication with an external module; and
    an external module including receiver/transmitter ports used to perform serial data communication with the main device,
    wherein the transmitter port of the external module transmits its identification information to the receiver port of the main device before the serial data communication is performed, and the transmitter port of the main device transmits a signal, indicating that the main device is connected to the external module, to the receiver port of the external module,
    wherein if the receiver port of the external module fails to receive the identification information confirmation signal from the transmitter port of the main device, the transmitter port of the external module periodically transmits a request to transmit the identification information confirmation signal to the receiver port of the main device for a predetermined period of time,
    wherein the identification information comprises a type of the external module, and the state of the main device is controlled in conformity with the type of the external module based on the identification information,
    wherein the main device comprises a universal asynchronous receiver/transmitter (UART) port, the external module comprises a UART port, and the main device and the external module communicate data using UART serial communication, and
    wherein the main device recognizes the type of the external module using only transmit (Tx) and receive (Rx) pins of the UART port without using a separate detection pin of the UART port.

12. The data communication system of claim 11, wherein the receiver/transmitter ports of the main device and the receiver/transmitter ports of the external module perform serial data communication therebetween after receiving/transmitting the identification information and the signal indicating that the main device has been connected to the external module.

13. The data communication system of claim 11, wherein the transmitter port of the external module periodically transmits its identification information to the receiver port of the main device.

14. The data communication system of claim 11, wherein the identification information received by the receiver port of the main device comprises information pertaining to a receiver, a serial number, version information, and category of the external module.

15. The data communication system of claim 11, wherein the signal indicating that the main device is connected to the external module and transmitted by the transmitter port of the main device comprises information pertaining to a transmitter, the serial number, the version information, and the category of the external module.

16. The data communication system of claim 11, wherein the main device determines a type of the external module from the identification information and converts its mode to a communication mode of the external module.

17. The data communication system of claim 11, wherein the main device recognizes the type of the external module based on the identification information, and displays a current data communication state according to the type of the external module.

18. A method of communicating data between a main device and an external module connected to the main device, the method comprising:

operating the external module to transmit its identification information including a type of the external module to the main device;

operating the main device to receive the identification information from the external module confirming its connection to the external module, and transmit an identification information confirmation signal to the external module;

controlling the state of the main device in conformity with the type of the external module based on the identification information; and if the external module fails to receive the identification information confirmation signal from the main device, operating the external module to periodically request the main device to transmit the identification information confirmation signal for a predetermined period of time; or if the external module receives the identification information confirmation signal, communicating data between the external module and the main device;

wherein the main device and the external module are operated to communicate data using UART serial communication between a universal asynchronous receiver/transmitter (UART) port of the main device and a UART port of the external module, and wherein the method further comprises operating the main device to recognize the type of the external module using only transmit (Tx) and receive (Rx) pins of the UART port without using a separate detection pin of the UART port.

19. The method of claim 18, wherein the identification information is periodically transmitted to the main device.

20. The method of claim 18, wherein the identification information confirmation signal comprises at least a signal indicating that the main device has been successfully connected to the external module.

21. The method of claim 18, further comprising:

operating the main device to determine a type of the external module from the identification information and convert its mode to a communication mode of the external module.

22. The method of claim 18, wherein the identification information received by the main device comprises information on a receiver, a serial number, version information, and category of the external module.

23. The method of claim 18, further comprising:

recognizing the type of the external module based on the identification information; and displaying a current data communication state according to the type of the external module on a display of the main device.

\* \* \* \* \*